(12) United States Patent
Iwaki

(10) Patent No.: US 6,983,384 B2
(45) Date of Patent: Jan. 3, 2006

(54) GRAPHICS CONTROLLER AND POWER MANAGEMENT METHOD FOR USE IN THE SAME

(75) Inventor: Tsutomu Iwaki, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 896 days.

(21) Appl. No.: 09/941,861

(22) Filed: Aug. 30, 2001

(65) Prior Publication Data

US 2002/0032877 A1    Mar. 14, 2002

(30) Foreign Application Priority Data

Aug. 31, 2000  (JP)  ............................. 2000-263874

(51) Int. Cl.
G06F 1/26    (2006.01)
G06F 1/32    (2006.01)

(52) U.S. Cl. ...................... 713/300; 713/320; 713/330

(58) Field of Classification Search ................. 713/300
See application file for complete search history.

(56) References Cited

U.S. PATENT DOCUMENTS

| | | | |
|---|---|---|---|
| 5,938,771 A | | 8/1999 | Williams et al. |
| 6,360,327 B1 * | | 3/2002 | Hobson ...................... 713/300 |
| 6,477,602 B1 * | | 11/2002 | Loison ....................... 710/301 |
| 6,510,525 B1 * | | 1/2003 | Nookala et al. ............ 713/324 |

* cited by examiner

*Primary Examiner*—Lynne H. Browne
*Assistant Examiner*—Stefan Stoynov
(74) *Attorney, Agent, or Firm*—Finnegan, Henderson, Farabow, Garrett & Dunner, L.L.P.

(57) ABSTRACT

A graphics controller can operate in a working state and a low power-consumption state. The graphics controller includes a register and a logic unit. The register is used to control the operating state of the logic unit. The graphics controller further includes a state controller configured to invalidate the state control data stored in the register and designating the low power-consumption state, thereby to maintain the logic unit in the working state.

15 Claims, 7 Drawing Sheets

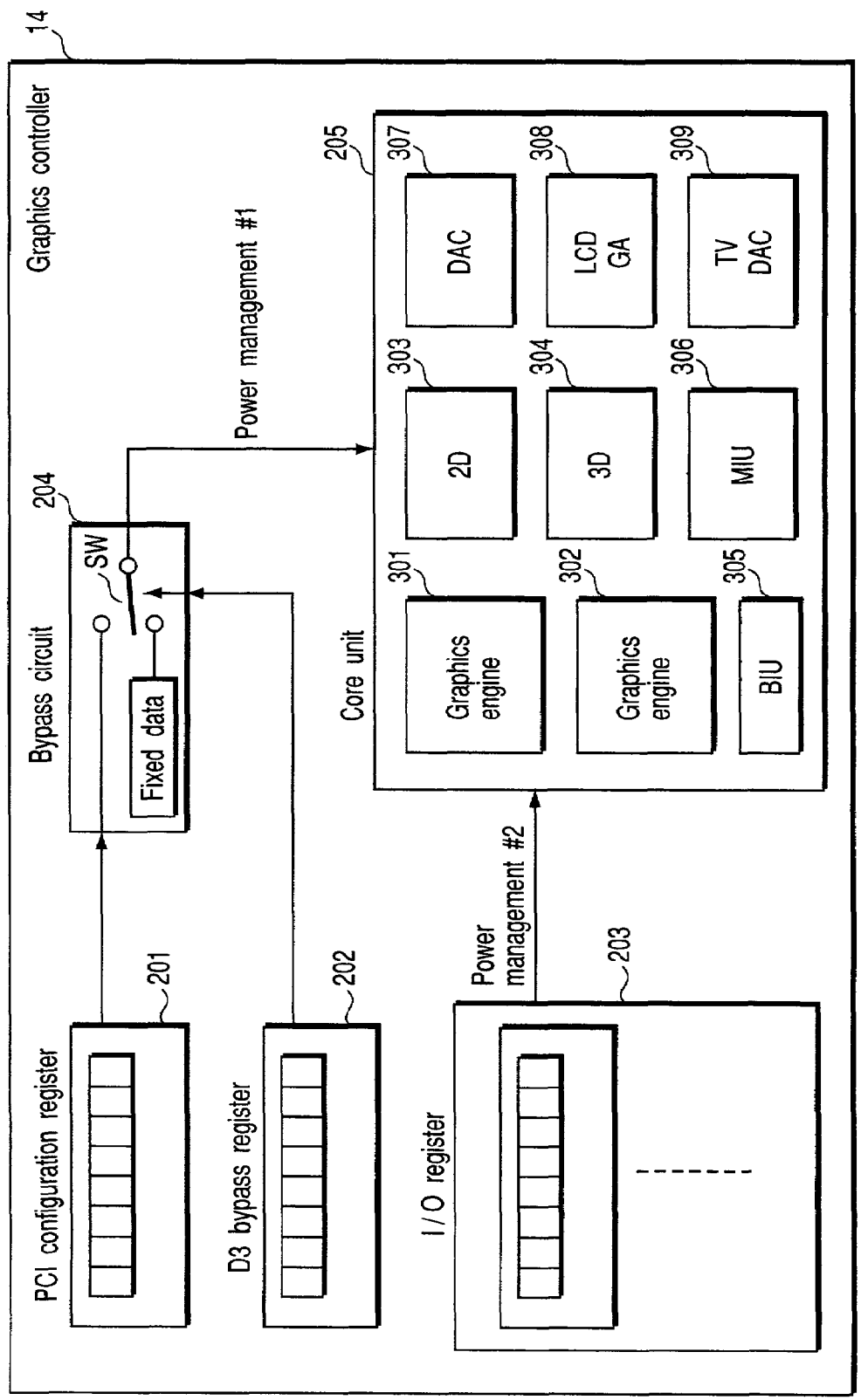
F I G. 4

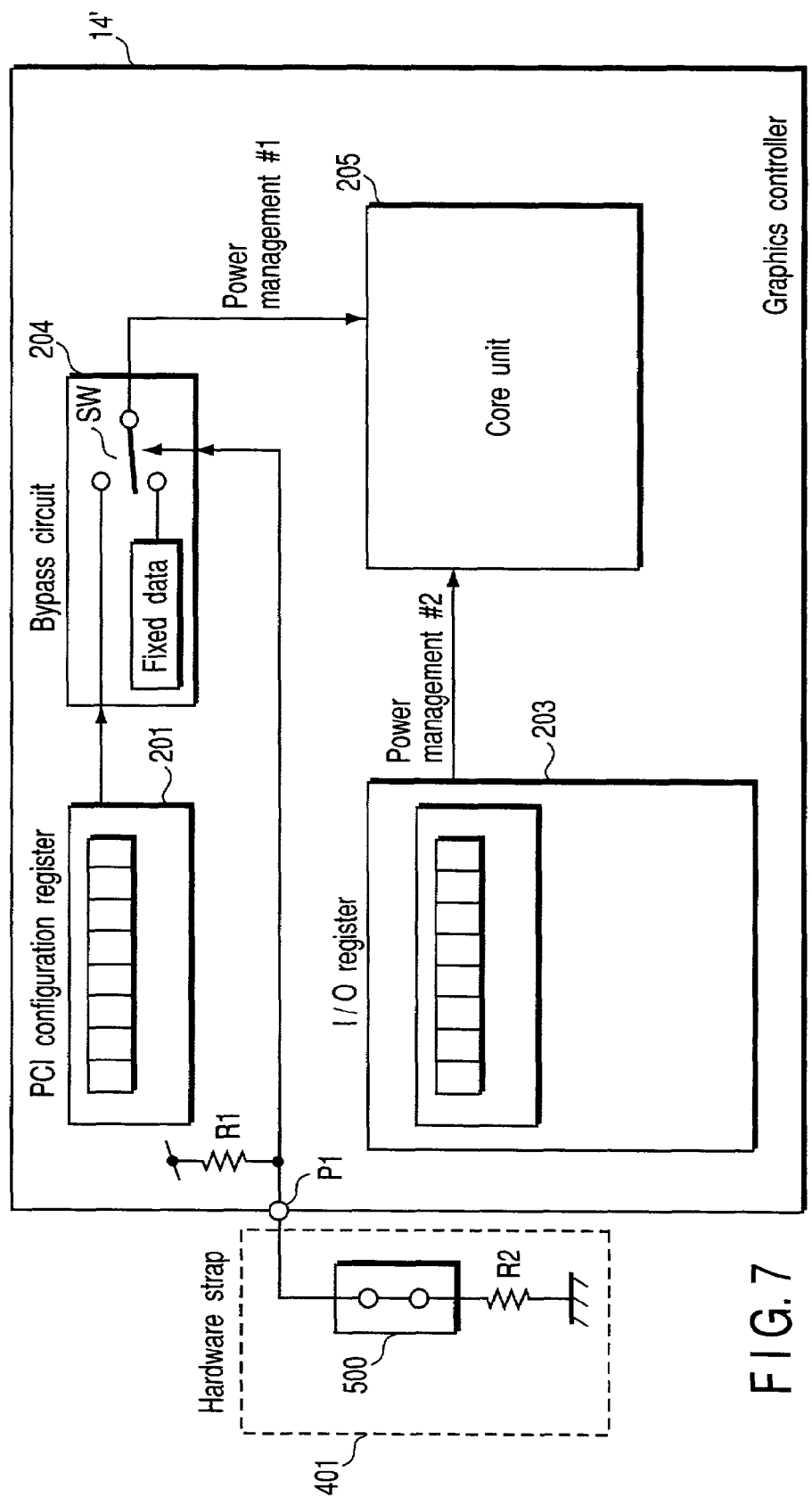
F I G. 7

GRAPHICS CONTROLLER AND POWER MANAGEMENT METHOD FOR USE IN THE SAME

CROSS-REFERENCE TO RELATED APPLICATIONS

This application is based upon and claims the benefit of priority from the prior Japanese Patent Application No. 2000-263874, filed Aug. 31, 2000, the entire contents of which are incorporated herein by reference.

BACKGROUND OF THE INVENTION

1. Field of the Invention

The present invention relates to a graphics controller for controlling the display monitor of a computer. The invention also relates to a power management method for use in the graphics controller.

2. Description of the Related Art

In recent years, various portable personal computers, such as notebook-type computers, that can be driven by batteries have been developed. Power management technique is employed in portable personal computers to save power. Known as a representative power management technique is Advanced Configuration and Power Interface (ACPI) specification. ACPI is a software/hardware specification formulated to enable the operating system (OS) to control power management directly. This software/hardware specification defines techniques such as system-power management, processor-power management and device-power management.

The system-power management is concerned with the entire computer system and defines the system-power states S0 to S5. State S0 is working state in which the system is on and the software is running. State S5 is off state in which the system is off and no software is running. The other states S1 to S4 are intermediate between the working state S0 and the off state S5. In these states S1 to S4, the context of any software is saved before the system goes into the sleep state, and any software is suspended. The system-power states S0 to S5 have a power-consumption relation of: S0>S1>S2>S3>S4>S5.

The processor-power management is concerned with the CPU (processor) incorporated in the computer system. It defines six states C0 to C5. The processor-power states C0 to C5 has a power-consumption relation of: C0>C1>C2>C3>C4>C5.

The device-power management is concerned with the devices provided on the bus. It defines four device-power states D0 to D3. The device-power states D0 to D3 has a power-consumption relation of: D0>D1>D2>D3.

In the device-power management, it is required that the devices, such as LCD panel, video adapter (i.e., graphics controller), IDE device, modem and the like, should support at least two device-power states D0 and D3 each. The device-power state D0 is a working state, in which the devices are completely active. The device-power state D3 is a power-saving state (low power-consumption state), in which the devices are off.

At present, the computer system may have troubles when the operating system (OS) performs a specific device-power management, due to the problems with the specification of the OS and other software or due to the defects in the software. For example, a trouble may occur in the computer system when the graphics controller is switched to state D3 to turn off the display screen.

The graphics controller is set to the state D3 in accordance with an instruction the OS gives when, for example, the keyboard of the computer system remains not operated for a prescribed time. Upon receiving the instruction designating the state D3, the graphics controller automatically transits from the present state to state D3 and stops operating. Usually, no software accesses the graphics controller to draw images or display images, as long as the graphics controller stays in the state D3. Due to the problems with the software specification or the software defects, however, the screen saver or any other similar software may try to access the graphics controller set in the state D3, in order to display images. In this case, the graphics controller makes no responses at all. Then, the software may freeze, or the computer system may hang up.

BRIEF SUMMARY OF THE INVENTION

An object of this invention is to provide a graphics controller that can prevent troubles from occurring from an access, if any, made by software after the instruction representing transition to a low power-consumption state has been issued.

Another object of the invention is to provide a power management method that can enable a graphics controller to prevent troubles from occurring from an access, if any, made by software after the instruction representing transition to a specific state has been issued.

A graphics controller according to an aspect of the invention, which controls a display monitor of a computer, comprises a register, a logic unit, and a state controller. The register can be accessed through a bus of the computer and can store state control data representing a state of the graphics controller. The logic unit can operate in a working state and a low power-consumption state and can transit to the working state or the low power-consumption state in accordance with the state control data stored in the register. The state controller can invalidate the state control data stored in the register and designating the low power-consumption state, thereby to maintain the logic unit in the working state in spite of the state control data designating the low power-consumption state.

The state controller may preferably operate in a first mode to prohibit the logic unit from transiting to the low power-consumption state and in a second mode to allow the logic unit to transit to the low power-consumption state. The graphics controller may further comprise a register configured to be accessed through the bus of the computer and to store mode-designating data that designates the first mode and the second mode.

In this case, the state controller can be easily controlled by software to prohibit the logic unit from transiting to the low power-consumption state when it is predicted that troubles occur in the computer, and to allow the logic unit to transit to the low power-consumption state when it is not predicted that troubles occur in the computer.

The state controller may include a selector configured to transmit to the logic unit either fixed data of the same value as state control data representing the working state or the state control data to be stored into the register. The selector selects the fixed data while the state control logic unit is operating in a first mode to prohibit the logic unit from transiting to the low power-consumption state. While the state control logic unit is operating in a second mode to allow the logic unit to transit to the low power-consumption state, the selector selects the register. Thus, the logic unit can be prohibited from transiting to the low power-consumption state and allowed to transit thereto, thanks to the use of the switch circuit that is simple in structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram illustrating the graphics controller incorporated in the computer system of FIG. 1;

FIG. 7 is a block diagram of a graphics controller that may be used in the computer system of FIG. 1, in place of the graphics controller shown in FIG. 4;

DETAILED DESCRIPTION OF THE INVENTION

Embodiments of the present invention will be described, with reference to the accompanying drawings.

Figure 1:
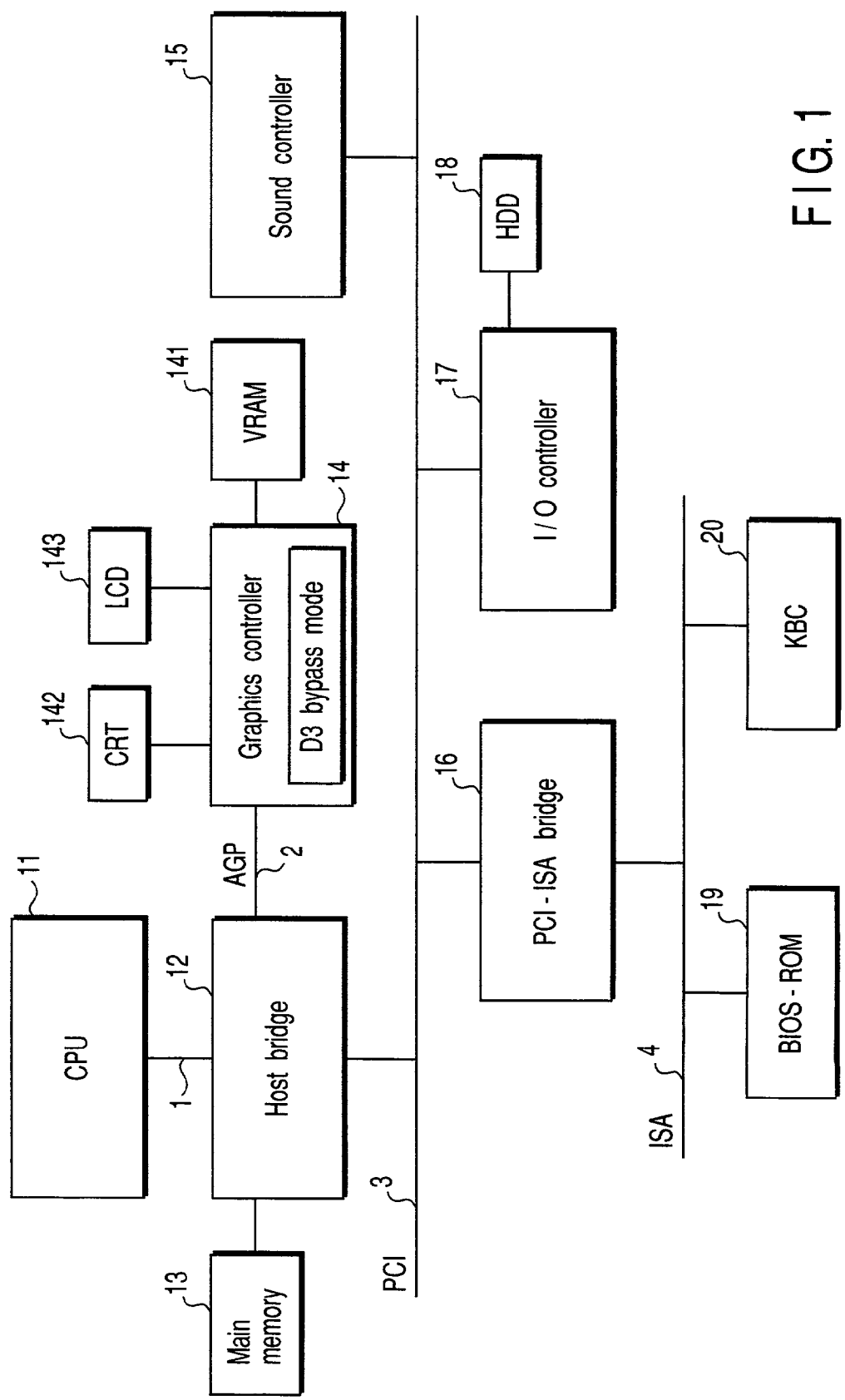
FIG. 1 is a block diagram showing the computer system relating using the first embodiment of the present invention.

FIG. 1 shows a computer system incorporating one embodiment of the present invention. The computer system is a notebook-type personal computer. As FIG. 1 shows, the notebook-type personal computer comprises a CPU 11, host bridge 12, main memory 13, graphics controller 14, sound controller 15, PCI-ISA bridge 16, I/O controller 17, hard disk drive (HDD) 18, BIOS-ROM 19 and keyboard controller (KBC) 20.

The CPU 11 is a processor for controlling the other components of the computer system. The CPU 11 executes various programs loaded in the main memory 13, such as a operating system (OS), and application programs. The CPU executes BIOS (Basic Input Output System) and the like, too. Both OS and BIOS accord with the Advanced Configuration and Power Interface (ACPI) specification.

The host bridge 12 is a bridge LSI designed to connect the CPU bus 1 and the PCI bus 3. The host bridge 12 includes a memory controller and an AGP (Accelerated Graphics Port) bridge. The memory controller controls the access to the main memory 13. The AGP bridge supplies and receives data to and from the graphics controller 14 via the AGP bus 2. The AGP bus 2 is dedicated to data transfer between the host bridge 12 and the graphics controller 14. It is one of the extension items of the PCI bus specification.

The graphics controller 14 is a display control device. It controls the LCD 143 and the external CRT display 142. Note that the LCD 143 and CRT display 142 are the display monitors of the computer system. The graphics controller 14 is comprised of a one-chip LSI. The graphics controller 14 works as a graphics accelerator. The controller 14 can write image data into the video memory (VRAM) 141, convert the data in the VRAM 141 to a display signal and output the display signal to the display monitors. The graphics controller 14 is a device that accords with the Advanced Configuration and Power Interface (ACPI) specification. It supports at least two of the device states D0 to D3, i.e., state D0 (working state) and state D3 (off state). (Recall that the device states D1 to D3 are low power-consumption states.) The graphics controller 14 incorporates a PCI-configuration register that is used to control the device state and the like. The graphics controller 14 goes into the device state D3 when the CPU 11 writes the state control data designating the state D3 into the PCI configuration register of the graphics controller 14 through the AGP bus 2. The state D3 is an off state in which the graphics controller 14 is turned off. Hence, in the device state D3, the device context is usually erased in the graphics controller 14.

The graphics controller 14 can operate in a special mode called "D3 bypass mode." In the D3-bypass mode, the state control data designating the state D3 and held in the PCI configuration register is neglected, whereby the graphics controller 14 is prohibited from transiting to the state D3. Thus, in the D3-bypass mode, the controller 14 remains in the state D0, not transiting to the state D3, in spite of the state control data designating the state D3 that is stored in the PCI configuration register. The D3-bypass mode can be validated and invalidated in accordance with the BIOS or with the hardware of the computer system.

The sound controller 15 is the sound source of the computer system. It can reproduce audio data and output the same. The sound controller 15 is another device that accords with the Advanced Configuration and Power Interface (ACPI) specification. It supports at least two of the device states D0 to D3, i.e., state D0 (working state) and state D3 (off state). The sound controller 15 incorporates a PCI-configuration register that is used to control the device state and the like. The sound controller 15 goes into the device state D3 when the CPU 11 writes the state control data designating the state D3 into the PCI configuration register of the sound controller 15 through the PCI bus 3. The state D3 is an off state in which the sound controller 15 is turned off. In the device state D3, the device context is usually erased in the sound controller 15.

The PCI-ISA bridge 16 is a bridge LSI designed to connect the PCI bus 3 and the ISA bus 4. To the ISA bus 4 there are connected the BIOS-ROM 19 and ISA devices such as the keyboard controller (KBC) 20. The BIOS-ROM 19 stores the system BIOS (Basic Input Output System). The system BIOS is composed of a POST routine for initializing and testing various devices when the system is powered on, BIOS drivers for controlling various types of hardware, and system management routines. The BIOS drivers include VGA-BIOS that controls the graphics controller 14. The system management routines provide various power management functions such as memory suspend and hibernation.

The memory suspend is a function that powered off almost all components of the computer system, except for the main memory 13, after the contexts of the CPU11 and the other devices, which are required to restore the present operating environment, have been stored in the main memory 13. The hibernation is a function that powered off almost all components including the main memory 13, after the contents of the main memory 13 and the contexts of the other devices, which are required to restore the present operating environment, have been stored in the prescribed region of the hard disk drive 18.

In the present embodiment, the memory suspend is used in the system state S3, and the hibernation is used in the system state S4. The system states S0 to S5 are not directly related to the device states D0 to D3. Rather, the OS can usually transit any device to any one of the states D0 to D3, whenever necessary, while the computer system remains in the system state S0 (i.e., the working state).

The state transition of the graphics controller 14 will be described with reference to FIGS. 2A and 2B.

Figure 2A:
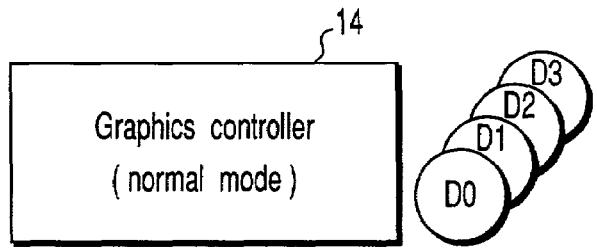
FIGS. 2A and 2B are diagrams explaining a state transition of the graphics controller incorporated in the computer system of FIG. 1.
Figure 2B:
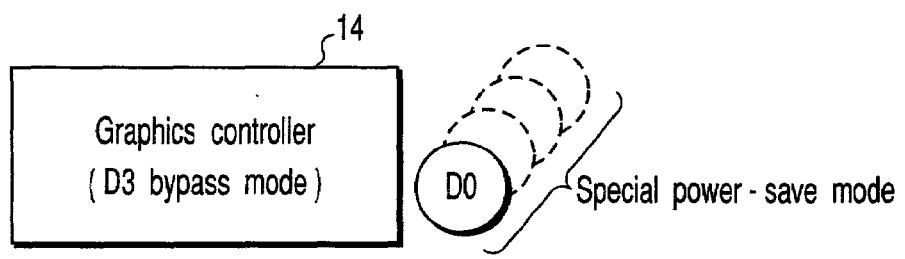

FIG. 2A shows how the graphics controller 14 transits from one state to another in the normal mode. FIG. 2B shows how the graphics controller 14 transits from one state to another in the D3 bypass mode.

The normal mode is a mode in which the graphics controller 14 can transit to the state D3; that is, the D3 bypass mode is invalidated. In the normal mode, the graphics controller 14 can be set into the state D0 or the state D3 by an access the OS or any other software makes to the PCI configuration register provided in the graphics controller 14. If the graphics controller 14 supports not only the states D0 and D3, but also the states D1 and D2, it can of course transit from any of the states D0 to D3 to another thereof in accordance with the state control data supplied from the OS or any other software to the PCI configuration register.

In the D3 bypass mode, the state control data representing the state D3 and supplied to the PCI configuration register is neglected. The graphics controller 14 remains in the state D0 and will not transit to the state D3 even if the state control data representing the state D3 is supplied from the OS and stored into the PCI configuration resister.

While the graphics controller 14 stays in the state D0, the system BIOS can directly control the core logic of the graphics controller 14, thereby decreasing the power consumption of the graphics controller 14. That is, the graphics controller 14 assumes a so-called "special power-save mode." In the special power-save mode, the following events take place:

(1) The supply of the operation clock signal to the DAC (D/A Converter) provided in the graphics controller 14 is stopped.

(2) Selected ones of the many hardware components of the core logic is disabled.

The power consumption of the graphics controller 14 can thereby be lowered even if the core logic of the graphics controller 14 is inhibited from entering the state D3.

Figure 3:
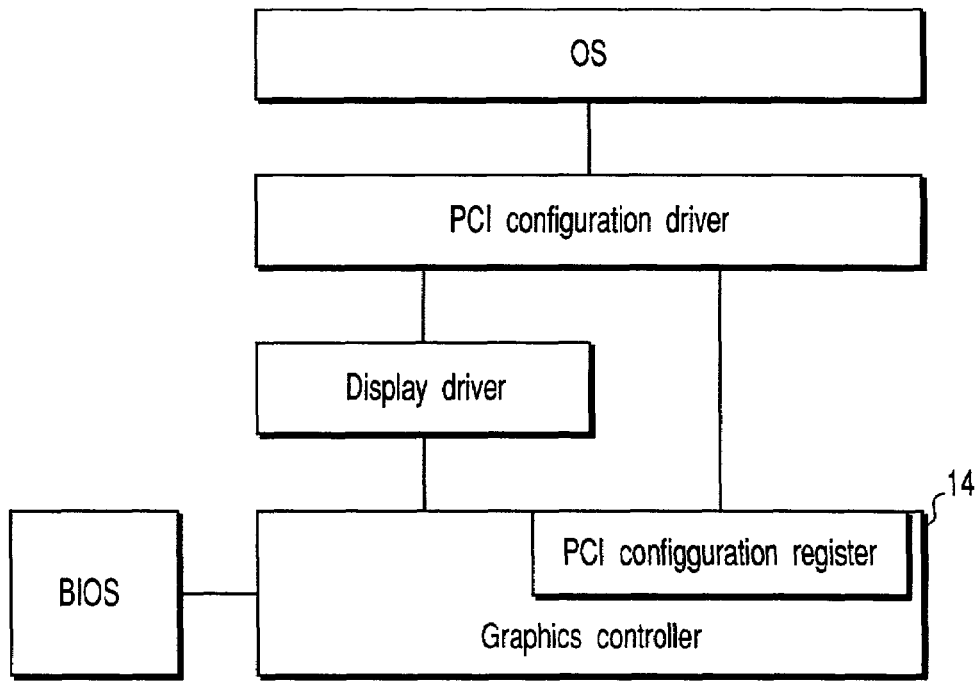
FIG. 3 is a diagram explaining the hierarchical structure of the software for controlling the graphics controller incorporated in the computer system of FIG. 1.

FIG. 3 illustrates the hierarchical structure of the software for controlling the graphics controller 14. To display images, the graphics controller 14 is accessed usually through a PCI configuration driver, and a display driver and the like, under the control of the operating system (OS). To set the graphics controller 14 into the state D3, the graphics controller 14 is accessed directly by the PCI configuration driver, not through the display driver, in accordance with a command supplied from the operating system (OS).

The BIOS has a communication interface for the display driver. It is however difficult for the BIOS to hook the access made to set the PCI configuration register into the state D3. This is because the graphics controller 14 is accessed not through the display driver. Therefore, in the present embodiment, the operation of the above-mentioned D3 bypass mode is accomplished by the use of hardware in the graphics controller 14. More precisely, the hardware logic (i.e., D3 bypass circuit) incorporated in the graphics controller 14 invalidates the state control data representing the state D3.

The hardware configuration of the graphics controller 14 will be described with reference to FIG. 4.

As FIG. 4 shows, the graphics controller 14 comprises a PCI configuration register 201, D3 bypass register 202, I/O registers 203, bypass circuit 204 and core unit (core logic unit) 205.

The core unit 205 is the main component of the graphics controller 14. The core unit 205 performs two functions. First, it performs graphics-drawing functions. Second, it controls the display monitors of the computer system. The core unit 205 can assume the states D0 and D3. As shown in FIG. 3, the core unit 205 has two graphics engines 301 and 302, a 2D-engine 303, a 3D-engine 304, an bus interface unit (BIU) 305, a memory interface unit (MIU) 306, a D/A converter (DAC) 307, an LCD gate array (LCD GA) 308, and a TV D/A converter (TV DAC) 309. The graphics engines 301 and 302 are provided to accomplish dual display control. The 2D-engine 303 processes data to generate 2D (two-dimensional) image data. The 3D-engine 304 processes data to generate 3D (three-dimensional) image data. The bus interface unit 305 transfers data through the AGP bus 2. The memory interface unit 306 is used to control the VRAM 141. The D/A converter 307 outputs analog video signals to the CRT display 142. The LCD gate array 308 is provided to control the LCD 143. The TV D/A converter 309 outputs video signals to television (TV) sets.

The PCI configuration register 201 can be accessed via the AGP bus 2. The register 201 is defined in a configuration space in which the various items of the operating environment of the graphics controller 14 are stored. The register 201 stores the state control data designating the state (either D0 or D3) into which the graphics controller 14, more correctly the core unit 205, should be set. The bypass circuit 204 is a state controller that invalidates the state control data representing the state D3, which is stored in the PCI configuration register 201. The circuit 204 has a switch circuit SW that supplies to the core unit 205 either the state control data stored in the register 201 or a fixed data of the same value as state control data representing the state D0.

The core unit 205 transits to the state D0 or D3 in accordance with the state control data supplied via the bypass circuit 20 and representing the state D0 or D3 (power management #1).

The D3 bypass register 202 can be accessed through the AGP bus 2. It is a special register defined in a configuration space or an I/O space. The BIOS writes the mode control data designating the D3 bypass mode or the normal mode into the D3 bypass register 202. If the mode control data designating the normal mode is written in the D3 bypass register 202, the switch circuit SW selects the PCI configuration register 201. If the mode control data designating the D3 bypass mode is written in the D3 bypass register 202, the switch circuit SW selects the fixed data that represents the state D0. The normal mode may be defined as the default-operating mode of the graphics controller 14.

I/O registers 203 include control registers, each designed to control the power consumption in the core unit 205 while the unit 205 remains in working state D0. The control registers can be accessed through the AGP bus 2. The BIOS set commands and parameters. The commands and the parameters are set to the I/O register 203 and directly control the core unit 205 that stays in the working state D0. The graphics controller 14 can therefore operate in the special power-save mode (power management #2). To reduce the power consumption of the core unit in the state D0, some operation controls are performed. More specifically, the graphics engines 301 and 302, 2D-engine 303, 3D-engine 304, BIU 305, MIU 306, DAC 307, LCD GA 308 and TV DAC 309 are selectively stopped, or the clock speed of the particular units such as DAC 307 is changed.

Figure 5:
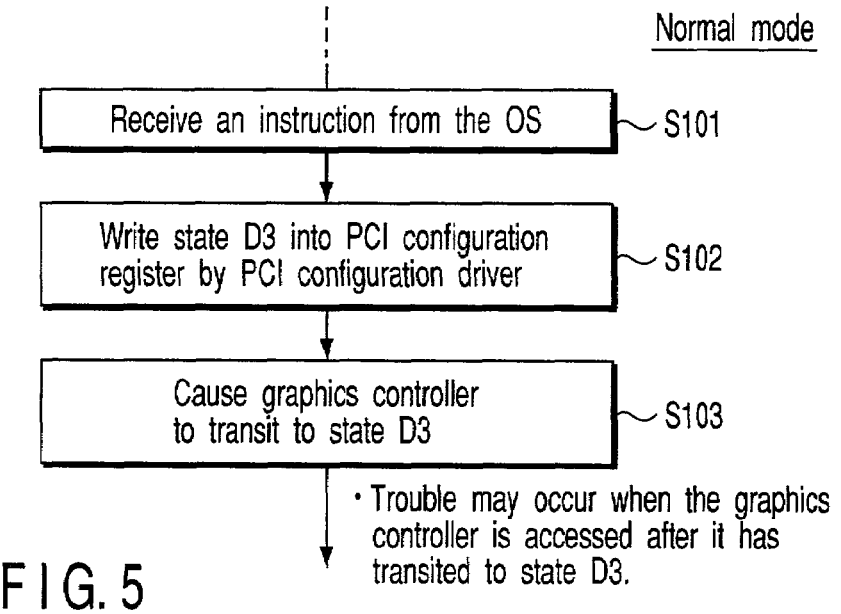
FIG. 5 is a flowchart explaining how the computer system of FIG. 1 operates in the normal mode.

How the computer system operates in the normal mode and how it operates in the D3 bypass mode will be explained, with reference to the flowcharts of FIGS. 5 and 6.

(Normal Mode)

The operating system (OS) may detect, on the basis of its policy, that a prescribed condition that should be satisfied to, for example, turn off a display screen. If this is the case, the operating system issues an instruction for setting the graphics controller 14 into the state D3 (Step S101). The instruction is supplied to the PCI configuration driver. In response to the instruction, the PCI configuration driver accesses the graphics controller 14 through the AGP bus 2 and writes the state control data representing the state D3 into the PCI configuration register 201 of the graphics controller 14 (Step S102).

The state control data representing the state D3 is supplied to the core unit 205, whereby the core unit 205 transits from the state D0 to the state D3. If the screen saver or any other software accesses the graphics controller 14 due to problems with the software specification or the software defects, the software will freeze, or the computer system may hang up. In order to achieve memory suspend in normal way, it is necessary to save the context of the graphics controller 14 into the main memory 13 before the graphics controller 14 transits to the state D3.

(D3 Bypass Mode)

Figure 6:
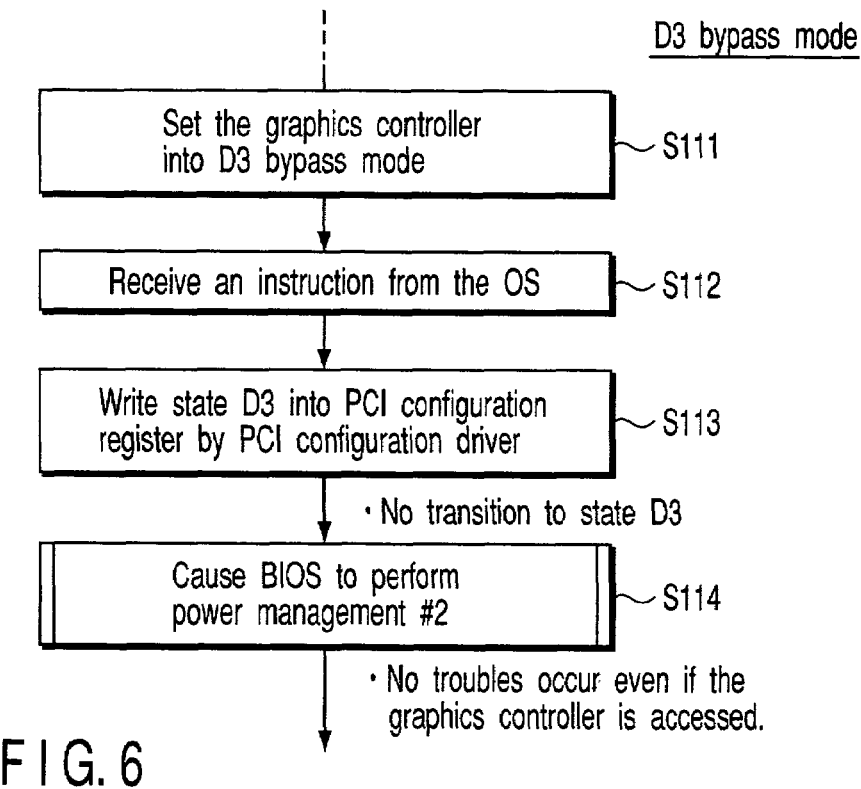
FIG. 6 is a flowchart explaining how the computer system of FIG. 1 operates in the D3-bypass mode.

As shown in FIG. 6, the BIOS accesses the graphics controller 14 via the AGP bus 2, for example when the computer system is powered on, thus writing the mode control data representing the D3 bypass mode, into the D3 bypass register 202 (Step S111). Therefore, the bypass circuit 204 selects the fixed data (=D0), regardless of the contents of the PCI configuration register 201.

The operating system (OS) may detect, on the basis of its policy, that the prescribed condition that should be satisfied to turn off a display screen. In this case, the operating system generates an instruction for setting the graphics controller 14 into the state D3 (Step S112). The instruction is supplied to the PCI configuration driver. In response to the instruction, the PCI configuration driver accesses the graphics controller 14 through the AGP bus 2 and writes the state control data representing the state D3 into the PCI configuration register 201 (Step S113). However, the state control data representing the state D3 is not supplied to the core unit 205. Therefore, the graphics controller 14 does not transit the state D3.

Thereafter, the BIOS performs, on the basis of its policy, the power management #2 on the graphics controller 14 (Step S114). More precisely, the BIOS controls the core unit 205 by way of the I/O register 203. If the screen saver or any other software accesses the graphics controller 14 due to problems with the software specification or the software defects, the software will not freeze, or the computer system will not hang up. This is because the graphics controller 14 is not set in the state D3. In the power management #2 the BIOS performs, the context of the graphics controller 14 would not be erased at all. Hence, memory suspend can be achieved in normal way and at any time, without the necessity of saving the context of the graphics controller 14 into the main memory 13 beforehand.

The graphics controller 14 may be replaced by a graphics controller 14' illustrated in FIG. 7. This graphics controller 14' will be described below.

The graphics controller 14' shown in FIG. 7 is designed to use a hardware strap 401 to control the bypass circuit 204, not by using the bypass register 202 as in the graphics controller shown in FIG. 4. The graphics controller 14' is identical to the graphics controller 14 in any other respects. The hardware strap 401 is connected to one input pin P1 of the graphics controller 14' that is a one-chip LSI. It supplies a mode control signal through the input pin P1 to the bypass circuit 204, to set the graphics controller 14' into either the normal mode or the D3 bypass mode. In the graphics controller 14', the input pin P1 is connected by a pull-up resistor R1 to a power-supply terminal, as is illustrated in FIG. 7.

The hardware strap 401 is mounted of the system board. As FIG. 7 shows, it comprises a jumper switch 500 and a pull-down resistor R2. When the jumper switch 500 is turned on, the input pin P1 is connected to the pull-down resistor R2. The mode control signal "0" that represents the D3 bypass mode is thereby supplied to the bypass circuit 204. On the other hand, when the jumper switch 500 is turned off, the control signal "1" that represents the normal mode is supplied to the bypass circuit 204. The jumper switch 500 may be preset either turned on state or turned off state prior to shipment of the computer system, in accordance with the type and/or version of the OS used in the computer system. Also, the jumper switch 500 may be set either turned on state or turned off state by user, after the computer system has be shipped.

The jumper switch 500 may be replaced by a dipswitch. The jumper switch may be dispensed with, if the graphics controller 14' is made to operate always in the D3 bypass mode. In this case, the input pin P1 may be soldered to the ground terminal provided on the system board.

Figure 8:
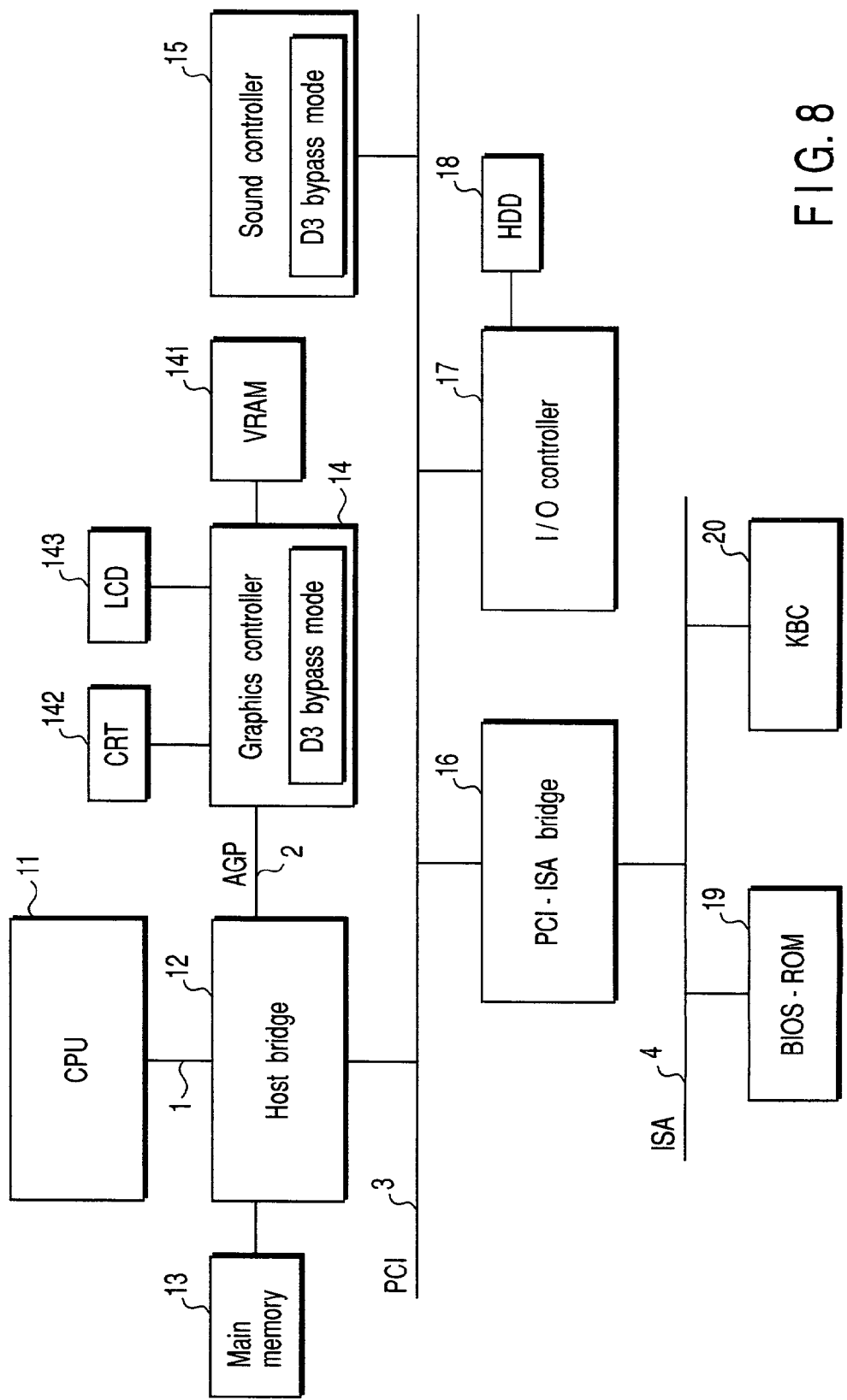
FIG. 8 is a block diagram of a modification of the computer system illustrated in FIG. 1.

FIG. 8 shows a modification of the computer system illustrated in FIG. 1. The modified computer system is identical to the system of FIG. 1, except that not only the graphics controller 14, but also the sound controller 15 can operate in the D3 bypass mode.

The sound controller 15 is of the same structure as the graphics controller 14 shown in FIG. 4. The sound controller 15 comprises a bypass circuit and a D3 bypass register. In the sound controller 15, too, the bypass circuit invalidates the state control data representing the state D3, which is stored in the PCI configuration register of the sound controller 15. The sound controller 15 can therefore be prohibited from transiting to the state D3.

How the computer system of FIG. 8 operates in the D3 bypass mode will be explained, with reference to the flowchart of FIG. 9.

(D3 Bypass Mode)

Figure 9:
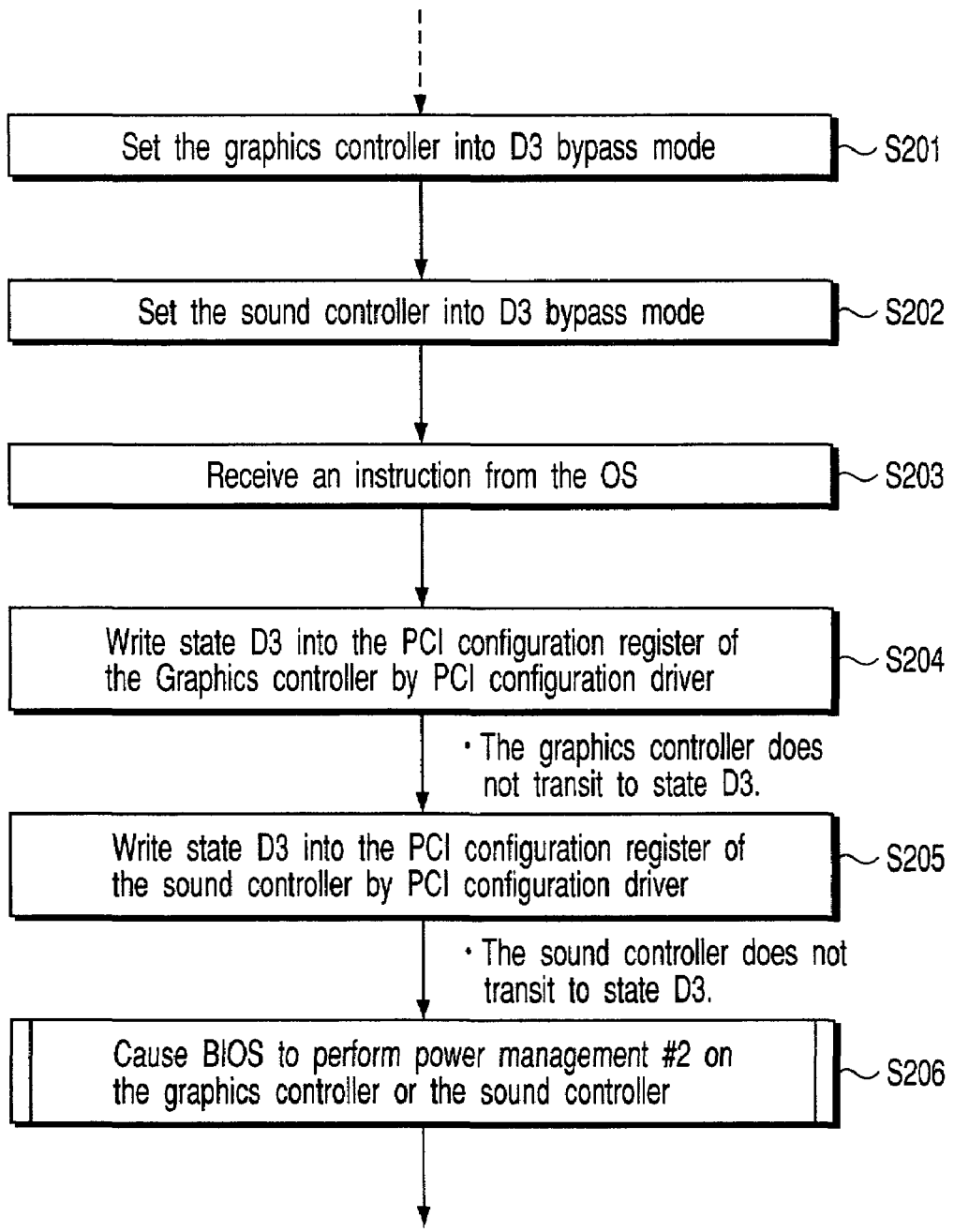
FIG. 9 is a flowchart explaining how the computer system of FIG. 8 operates in D3-bypass mode.

As shown in FIG. 9, the BIOS accesses the graphics controller 14 via the AGP bus 2, for example when the computer system is powered on, thus writing the mode control data representing the D3 bypass mode, into the D3 bypass register 202 (Step S201). Therefore, the bypass circuit 204 selects the fixed data (=D0), regardless of the contents of the PCI configuration register 201. The graphics controller 14 is thereby set into the D3 bypass mode. Then, the BIOS accesses the sound controller 15 via the PCI bus 3, writing the mode control data representing the D3 bypass mode into the D3 bypass register incorporated in the sound controller 15. The sound controller 15 is set into the D3 bypass mode, too (Step S202).

The operating system (OS) may detect, on the basis of its policy, that the prescribed condition that should be satisfied to turn off a display screen. In this case, the operating system generates an instruction for causing the PCI configuration driver to set the graphics controller 14 into the state D3 (Step S203). The instruction is supplied to the PCI configuration driver. In response to the instruction, the PCI configuration driver accesses the graphics controller 14 through the AGP bus 2 and writes the state control data representing the state D3 into the PCI configuration register 201 (Step S204). However, the state control data representing the state D3 is not supplied to the core unit 205. Therefore, the graphics controller 14 does not transit the state D3. The holds true of the sound controller 15.

The operating system may generate an instruction for causing the PCI configuration driver to set the sound controller 15 into the state D3. In response to the instruction, the PCI configuration driver accesses the sound controller 15 through the PCI bus 3 and writes the state control data representing the state D3 into the PCI configuration register of the sound controller 15 (Step S205). However, The sound controller 15 does not transit to the state D3.

Thereafter, the BIOS performs, on the basis of its policy, the power management #2 on the graphics controller 14 or the sound controller 15 (Step S206). More precisely, the power management #2 for the sound controller 15 is performed as the BIOS controls the hardware components of the sound controller 15 by way of the I/O register of the sound controller 15.

Even if the screen saver or any other software accesses the graphics controller 14 or the sound controller 15 due to problems with the software specification or the software defects, the software will not freeze, or the computer system will not hang up. This is because neither the graphics controller 14 nor the sound controller 15 is set in the state D3. In the power management #2 the BIOS performs, the context of the graphics controller 14 and that of the sound controller 15 would not be erased at all. Hence, memory suspend can be accomplished in normal way and at any time, without the necessity of saving the contexts of the graphics controller 14 and the sound controller 15 into the main memory 13 beforehand.

The configuration of the present embodiment can be applied to various devices connected to a computer (the devices provided on the bus, the peripheral devices, and the like). In the normal mode, any device that can operate in at least a working state and a low power-consumption state can transit from the working state to the low power-consumption state upon receipt of a state transition instruction. In the bypass mode, the device is prohibited from transiting from the working state to the low power-consumption state, notwithstanding the state transition instruction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graphics controller for controlling a display monitor of a computer, comprising:
    a register configured to be accessed through a bus of the computer and to store state control data designating a state that the graphics controller is to assume;
    a logic unit configured to operate in a working state and a low power-consumption state and to transit to the working state or the low power-consumption state in accordance with the state control data stored in the register; and
    a switch provided between the register and the logic unit and configured to prohibit the state control data designating the low power-consumption state from being transmitted from the register to the logic unit, thereby to maintain the logic unit in the working state.

2. The graphics controller according to claim 1, wherein the switch has a first mode for prohibiting the logic unit from transiting to the low power-consumption state and a second mode for allowing the logic unit to transit to the low power-consumption state, and the switch prohibits the state control data designating the low power-consumption state from being transmitted from the register to the logic unit, in the first mode.

3. The graphics controller according to claim 2, further comprising a register configured to be accessed through the bus of the computer and to store mode-designating data that designates either the first mode or the second mode.

4. The graphics controller according to claim 2, further comprising an input pin configured to receive from an external device a mode-designating data that designates either the first mode or the second mode.

5. A graphics controller for controlling a display monitor of a computer, comprising:
    a register configured to be accessed through a bus of the computer and to store state control data designating a state that the graphics controller is to assume;
    a logic unit configured to operate in a working state and a low power-consumption state and to transit to the working state or the low power-consumption state in accordance with the state control data stored in the register; and
    a state controller configured to invalidate the state control data designating the low power-consumption state stored in the register,
    wherein the state controller includes a selector configured to transmit to the logic unit either fixed data of the same value as state control data representing the working state or the state control data to be stored into the register; and to select the fixed data while the state controller is operating in a first mode to prohibit the logic unit from transiting to the low power-consumption state, and select the register while the state controller is operating in a second mode to allow the logic unit to transit to the low power-consumption state.

6. The graphics controller according to claim 1, wherein the low power-consumption state is an off state in which the operation of the logic unit is stopped.

7. The graphics controller according to claim 1, further comprising a control register configured to be accessed through the bus of the computer and to store control data for controlling a power consumption of the logic unit stayed in the working state.

8. A computer system in which an operating system performs power management control, said computer system comprising:
    a graphics controller configured to control a display monitor and including a logic unit which operates in a working state and a low power-consumption state and which consumes less power in the low power-consumption state than in the working state;

a register provided in the graphics controller and configured to store state control data for transiting the logic unit to either the working state or the low power-consumption state;

a CPU that writes into the register the state control data designating the low power-consumption state, in accordance with an instruction from the operating system; and a switch provided between the register and the logic unit and configured to prohibit the state control data designating the low power-consumption state from being transmitted from the register to the logic unit, thereby to prohibit the logic unit from transiting to the low power-consumption state from the working state.

9. A computer system in which an operating system performs power management control, said comnuter system comprising:

a graphics controller configured to control a display monitor and including a logic unit which operates in a working state and a low power-consumption state and which consumes less power in the low power-consumption state than in the working state;

a register provided in the graphics controller and configured to store state control data for transiting the logic unit to either the working state or the low power-consumption state;

a CPU that writes into the register the state control data designating the low power-consumption state, in accordance with an instruction from the operating system; and a state controller provided in the graphics controller and configured to invalidate the state control data designating the low power-consumption state stored in the register, wherein the state controller includes a selector configured to transmit to the logic unit either fixed data of the same value as state control data representing the working state or the state control data to be stored into the register; and to select the fixed data while the state controller is operating in a first mode to prohibit the logic unit from transiting to the low power-consumption state, and select the register while the state controller is operating in a second mode to allow the logic unit to transit to the low power-consumption state.

10. The computer system according to claim 8, further comprising a control register provided in the graphics controller and configured to be accessed through a bus of the computer and to store control data for controlling a power consumption of the logic unit stayed in the working state.

11. A device for use as a hardware component in a computer, said device comprising:

a register configured to be accessed through a bus of the computer and to store state control data designating a state that the device is to assume;

a logic unit configured to operate in a working state and a low power-consumption state and to transit to the working state or the low power-consumption state in accordance with the state control data stored in the register; and a switch provided between the register and the logic unit and configured to prohibit the state control data designating the low power-consumption state from being transmitted from the register to the logic unit, thereby to maintain the logic unit in the working state.

12. The device according to claim 11, wherein the switch has a first mode for prohibiting the logic unit from transiting to the low power-consumption state and a second mode for allowing the logic unit to transit to the low power-consumption state, and the switch prohibits the state control data designating the low power-consumption state from being transmitted from the register to the logic unit while the switch is in the first mode.

13. The device according to claim 12, further comprising a register configured to be accessed through the bus of the computer and to store mode-designating data that designates either the first mode or the second mode.

14. The device according to claim 12, further comprising an input pin configured to receive from an external device a mode-designating data that designates either the first mode or the second mode.

15. A device for use as a hardware component in a computer, said device comprising:

a register configured to be accessed through a bus of the computer and to store state control data designating a state that the device is to assume;

a logic unit configured to operate in a working state and a low power-consumption state and to transit to the working state or the low power-consumption state in accordance with the state control data stored in the register; and a state controller configured to invalidate the state control data designating the low power-consumption state stored in the register, wherein the state controller includes a selector configured to transmit to the logic unit either fixed data of the same value as state control data representing the working state or the state control data to be stored into the register; and to select the fixed data while the state controller is operating in a first mode to prohibit the logic unit from transiting to the low power-consumption state, and select the register while the state controller is operating in a second mode to allow the logic unit to transit to the low power-consumption state.

* * * * *